United States Patent [19]

Masumoto

[11] Patent Number: 4,701,033
[45] Date of Patent: * Oct. 20, 1987

[54] VARIABLE FOCAL LENGTH LENS SYSTEM
[75] Inventor: Hisayuki Masumoto, Sakai, Japan
[73] Assignee: Minolta Camera Kabushiki Kaisha, Osaka, Japan
[*] Notice: The portion of the term of this patent subsequent to Jun. 16, 2004 has been disclaimed.
[21] Appl. No.: 648,019
[22] Filed: Sep. 6, 1984
[30] Foreign Application Priority Data
  Sep. 9, 1983 [JP] Japan ................... 58-167319
  Aug. 17, 1984 [JP] Japan ................... 59-172306
[51] Int. Cl.$^4$ ........................... G02B 15/15
[52] U.S. Cl. ........................ 350/425; 350/423
[58] Field of Search ............. 350/425, 423, 427, 450
[56] References Cited

U.S. PATENT DOCUMENTS 4,256,381 3/1981 Kreitzer ............................ 350/423
  4,494,828 1/1985 Masumoto et al. ............... 350/427

FOREIGN PATENT DOCUMENTS 56-128911 10/1981 Japan .
  0168209 10/1982 Japan ................... 350/423
  57-201213 12/1982 Japan .
  58-137813  8/1983 Japan .
  58-184915 10/1983 Japan .
  58-184916 10/1983 Japan .
  58-184917 10/1983 Japan .
  58-199312 11/1983 Japan .
  58-215620 12/1983 Japan .
  58-224322 12/1983 Japan .

*Primary Examiner*—John K. Corbin
*Assistant Examiner*—Rebecca D. Gass
*Attorney, Agent, or Firm*—Price, Gess & Ubell

[57] ABSTRACT

A variable focal length lens system wherein the system comprises a first lens unit of a positive refractive power, a second lens unit of a negative refractive power with a first variable air space formed between the first and second lens units, a third lens unit of a positive refractive power, and a fourth lens unit of a negative refractive power with a second variable air space formed between the third lens unit and fourth lens unit. The back focal length of the whole lens system for the shortest focal length is less than half of the diagonal length of the image plane. The first lens unit is shiftable from the image side to the object side while increasing the first variable air space in the zooming operation from the shortest focal length to the longest focal length. The fourth lens unit is shiftable from the image side to the object side while decreasing the second variable air space in the zooming operation from the shortest focal length to the longest focal length.

22 Claims, 28 Drawing Figures

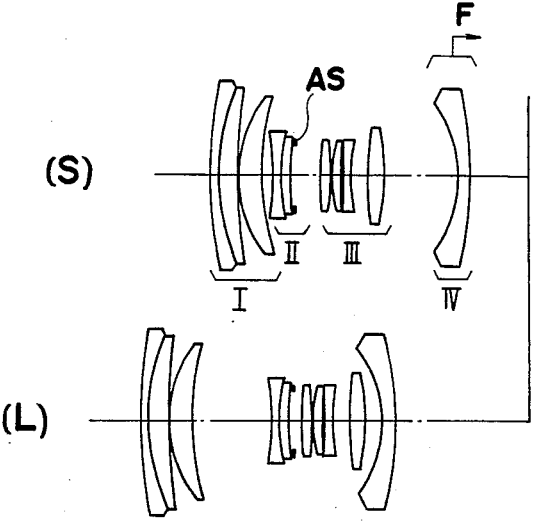
FIG. 5a (S)
FIG. 5b (L)
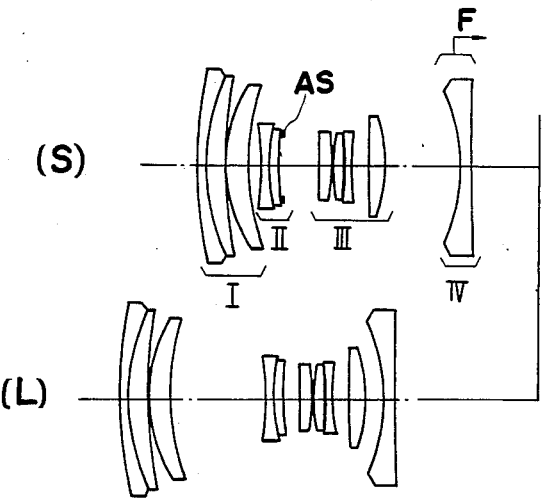
FIG. 6a (S)
FIG. 6b (L)

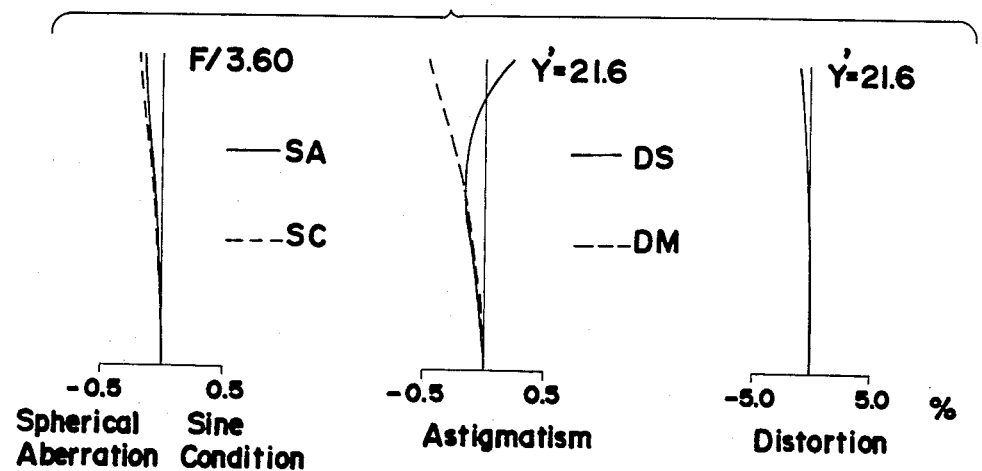
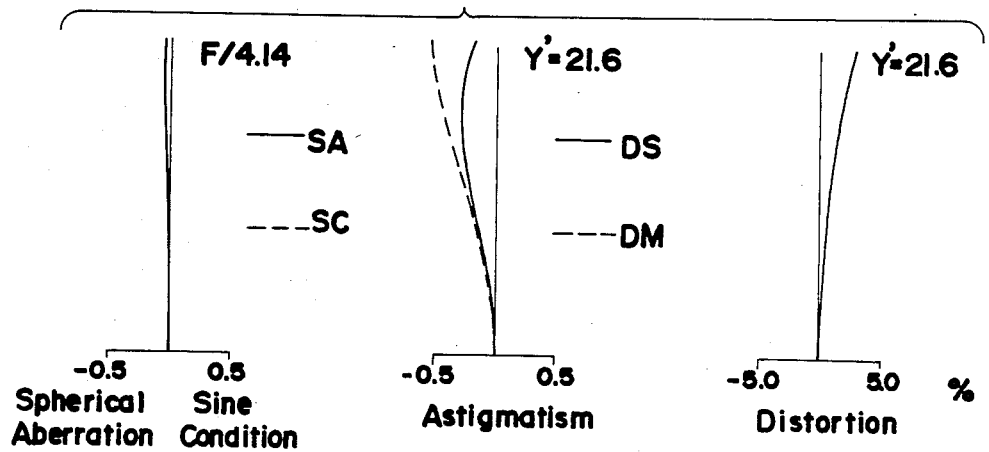
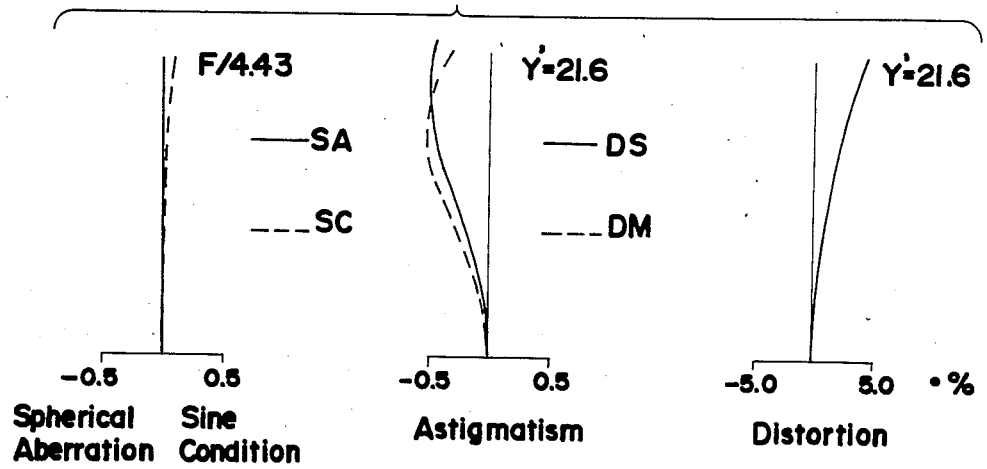

VARIABLE FOCAL LENGTH LENS SYSTEM

BACKGROUND OF THE INVENTION

1. Field of the Invention

This invention relates to a variable focal length lens system in which the lower limit of the back focal length is not restricted, such as a compact zoom lens system used for 35 mm lens-shutter type camera.

2. Description of the Prior Art

Conventionally, there is known a two group type compact zoom lens system which comprises from the object side to the image side, a first lens group of a negative refractive power and a second lens group of a positive refractive power. On the other hand, in order to increase the zoom ratio, there are provided various types of zoom lens systems in which a lens group of a positive refractive power is located at the most objective side of the whole lens system, and in which a plurality of lens groups are shifted in the zooming operation. Almost all types of such zoom lens systems, however, are designed for a single lens reflex camera which requires sufficient room for the reflex mirror to swing therein. Thus, since the lower limit of the back focal length is restricted the total length of such zoom lens system, i.e., the distance from the object side surface of the lens element located at the most object side to the image plane, is relatively long.

Contrarily, as a compact zoom lens system in which the lower limit of the back focal length is not restricted, there are shown a type of lens system which includes, from the object side to the image side, a first lens group of a positive refractive power and a second lens group of a negative refractive power. This type is disclosed in Japanese Laid-Open Patent Application No. Sho 56-128911, and Sho 57-201213. In this type, however, since the shifting amount of the lens group shifted in the zooming operation is relatively long, the lens barrel of such a zoom lens system becomes big. Furthermore, in this type, since an aperture stop is shifted along the optical axis in the zooming operation, the construction of the lens barrel becomes complicated. Especially, if this type of zoom lens system is used for a 35 mm lens-shutter camera, such a camera becomes big and complicated because it requires to locate a plurality of shutter blades and its driving unit near the aperture stop.

Additionally, in a zoom lens system of this type, the effective F-number of the whole lens system inevitably changes in the zooming operation. If such a change is desired to be compensated, the real aperture size of the stop has to be changed in accordance with the zooming operation. Such a compensation is especially necessitated in the case that the exposure amount is controlled by a system other than the TTL light measurement.

SUMMARY OF THE INVENTION

The object of the present invention is to provide a variable focal length lens system of a novel type which has a high optical performance and which is suitable for a camera having no lower limit of the back focal length of the lens system.

The other object of the present invention is to provide a variable focal length lens system which is ultra compact in comparison with the conventional zoom lens system while maintaining high optical performance.

The other object of the present invention is to provide a variable focal length lens system capable of making the focusing mechanism thereof compact and simple in construction.

The further other object of the present invention is to provide a variable focal length lens system suitable for use in an automatic focusing camera.

According to the present invention, a variable focal length lens system comprises, from the object side to the image side, a first lens unit of a positive refractive power, a second lens unit of a negative refractive power with a first variable air space formed between the first and second lens units, a third lens group of a positive refractive power, and a fourth lens unit of a negative refractive power with a second variable air space formed between the third lens unit and fourth lens unit, wherein the back focal length of the whole lens system for the shortest focal length is less than half of the diagonal length of the image plane, wherein the first lens unit is shifted from the image side to the object side while increasing the first variable air space in the zooming operation from the shortest focal length to the longest focal length, and wherein the fourth lens unit is shifted from the image side to the object side while decreasing the second variable air space in the zooming operation from the shortest focal length to the longest focal length.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIGS. 5a and 5b represent cross sectional views of the lens system according to the embodiment 5 of the present invention;

FIGS. 6a and 6b represent cross sectional views of the lens system according to the embodiment of the present invention;

FIGS. 10a and 10c represent the aberration curves of the embodiment 2 for the shortest, middle, and longest focal lengths, respectively;

DETAILED DESCRIPTION OF THE PREFERRED EMBODIMENTS

Figure 1A:
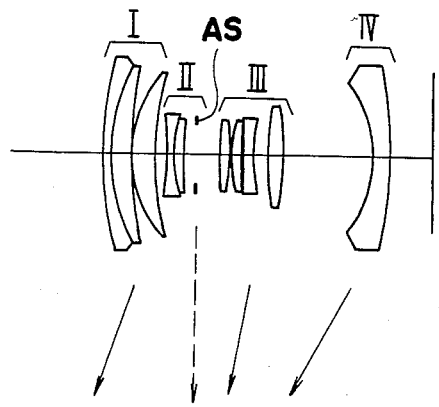
FIGS. 1a and 1b represent cross sectional views of the lens system according to the embodiment 1 of the present invention.

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm lens-shutter camera.

In the drawings, schematic cross sectional views disclose the position of the lens group and lens elements for the shortest focal length S and the longest focal length L with arrows therebetween representing the directions of their movements for zooming toward the longest focal length L. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 1B:
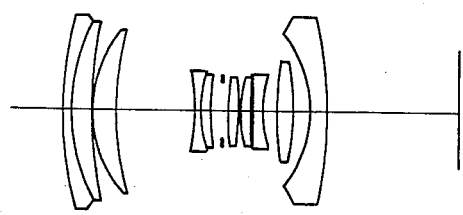
Figure 2A:
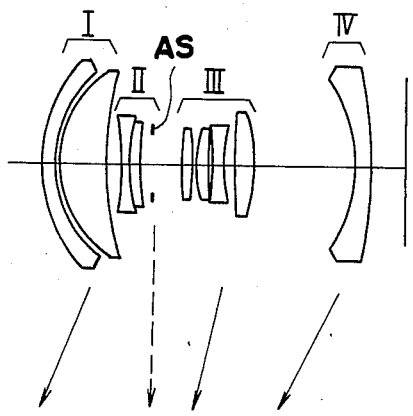
FIGS. 2a and 2b represent cross sectional views of the lens system according to the embodiment 2 of the present invention.
Figure 2B:
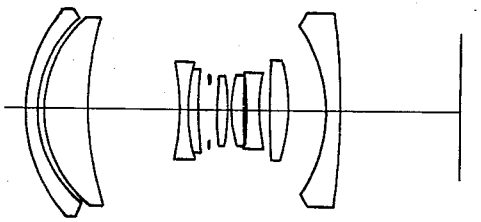
Figure 3A:
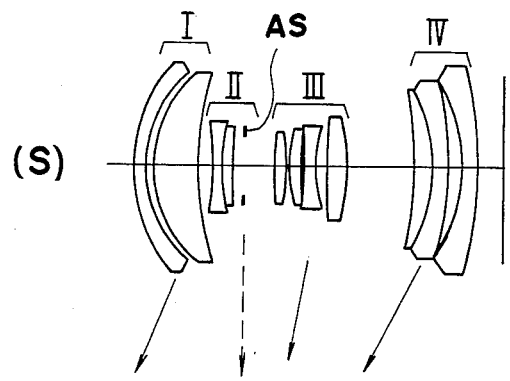
FIGS. 3a and 3b represent cross sectional views of the lens system according to the embodiment 3 of the present invention.
Figure 3B:
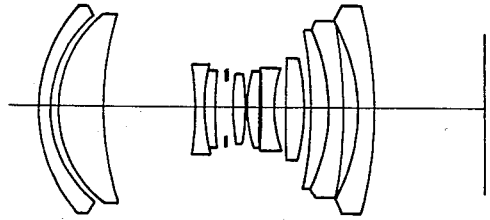
Figure 4A:
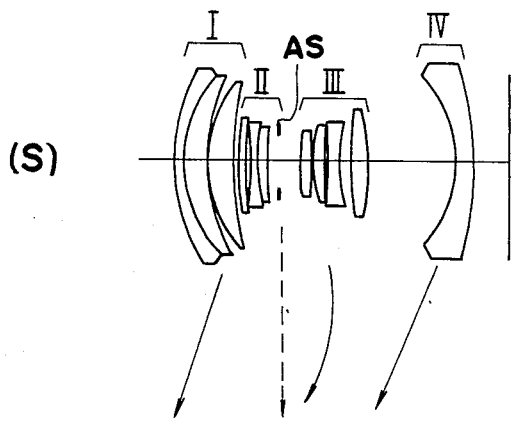
FIGS. 4a and 4b represent cross sectional views of the lens system according to the embodiment 4 of the present invention.
Figure 4B:
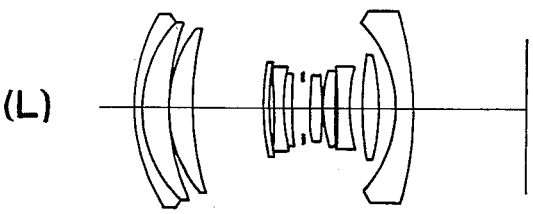
Figure 7A:
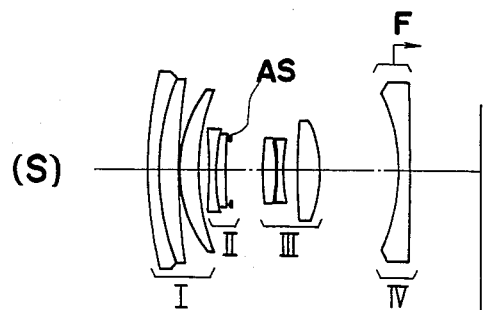
FIGS. 7a and 7b represent cross sectional views of the lens system according to the embodiment 7 of the present invention.
Figure 7B:
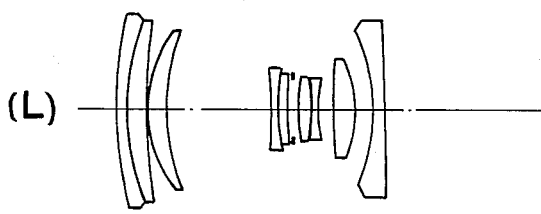
Figure 8A:
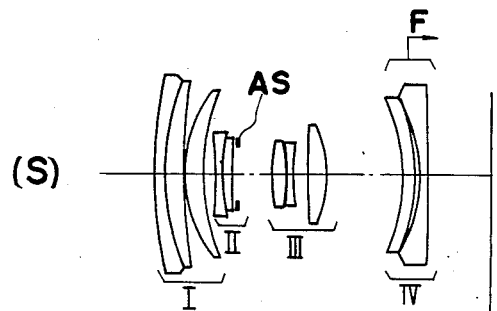
FIGS. 8a and 8b represent cross sectional views of the lens system according to the embodiment 8 of the present invention.
Figure 8B:
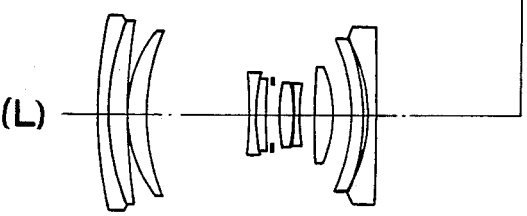
Figure 9A:
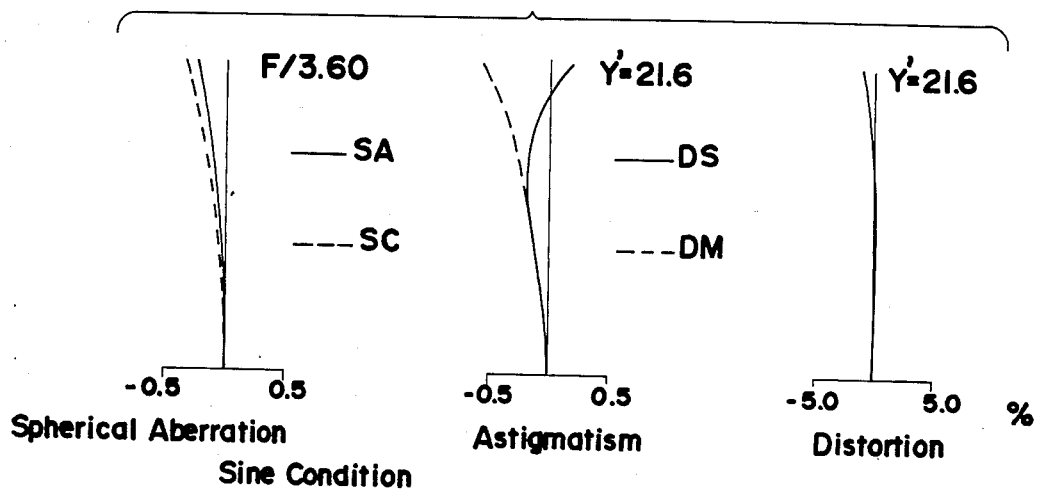
FIGS. 9a and 9c represent the aberration curves of the embodiment 1 for the shortest, middle, and longest focal lengths, respectively.
Figure 9B:
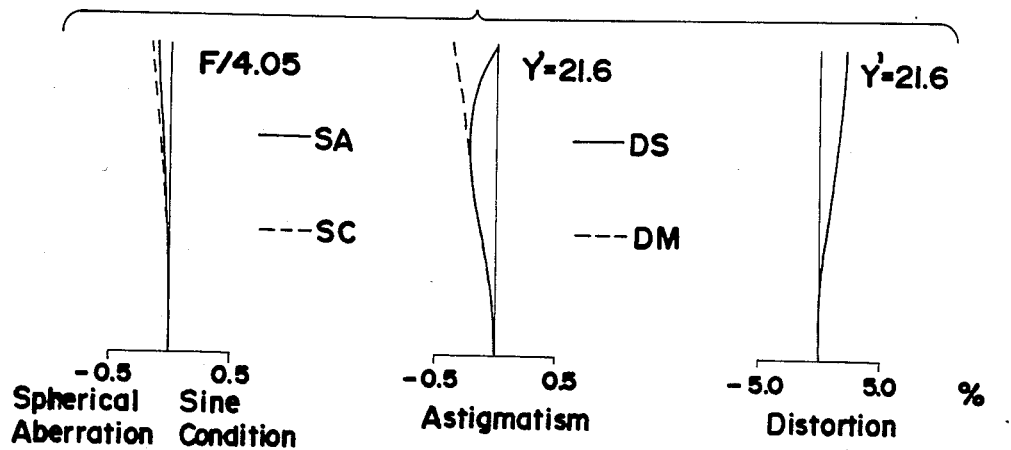
Figure 9C:
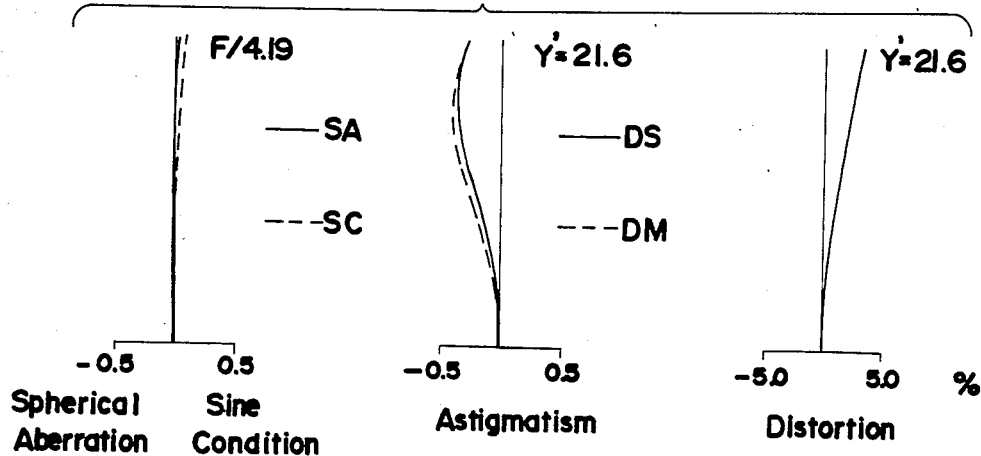
Figure 11A:
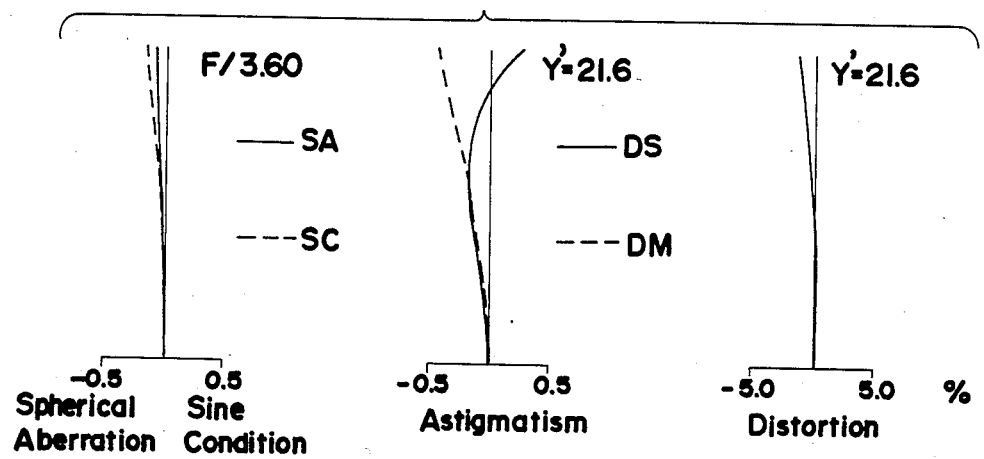
FIGS. 11a and 11c represent the aberration curves of the embodiment 3 for the shortest, middle, and longest focal lengths, respectively.
Figure 11B:
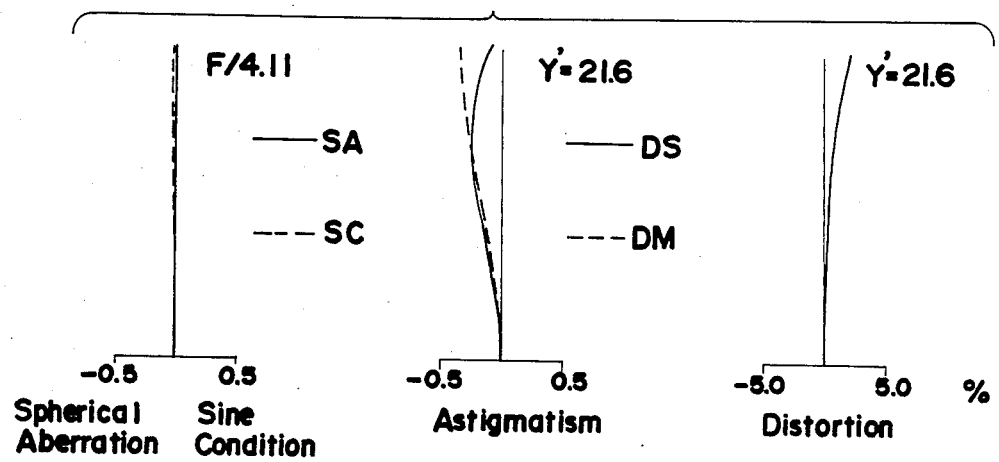
Figure 11C:
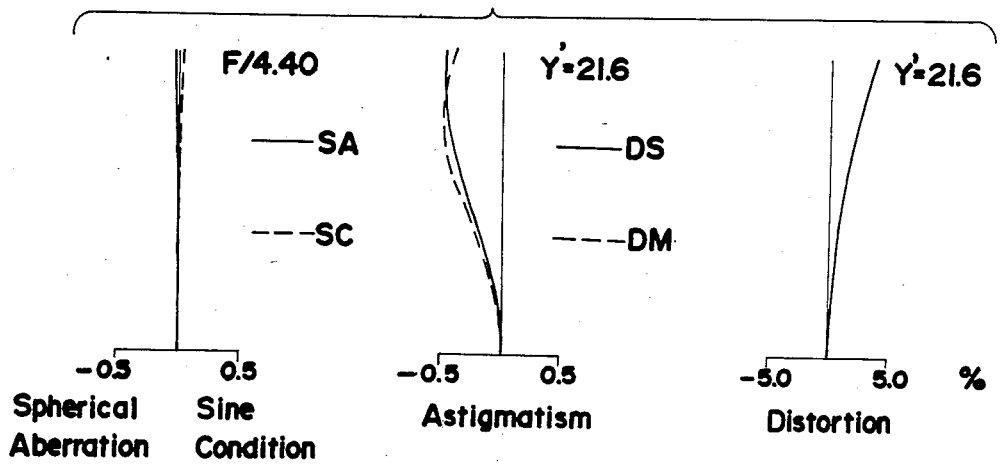
Figure 12A:
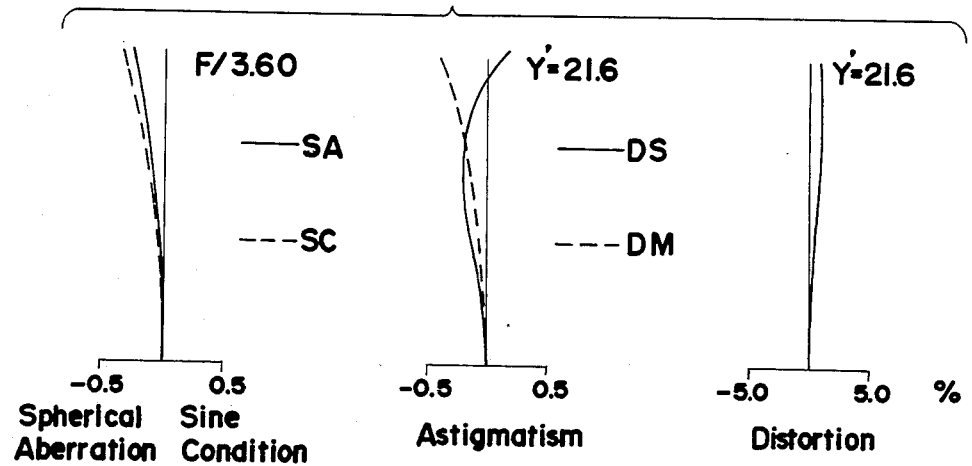
FIGS. 12a and 12c represent the aberration curves of the embodiment 4 for the shortest, middle, and longest focal lengths, respectively.
Figure 12B:
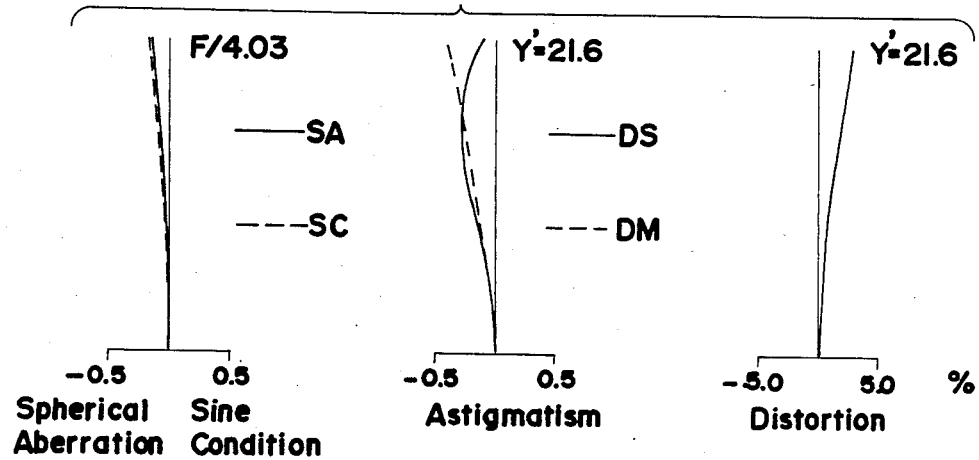
Figure 12C:
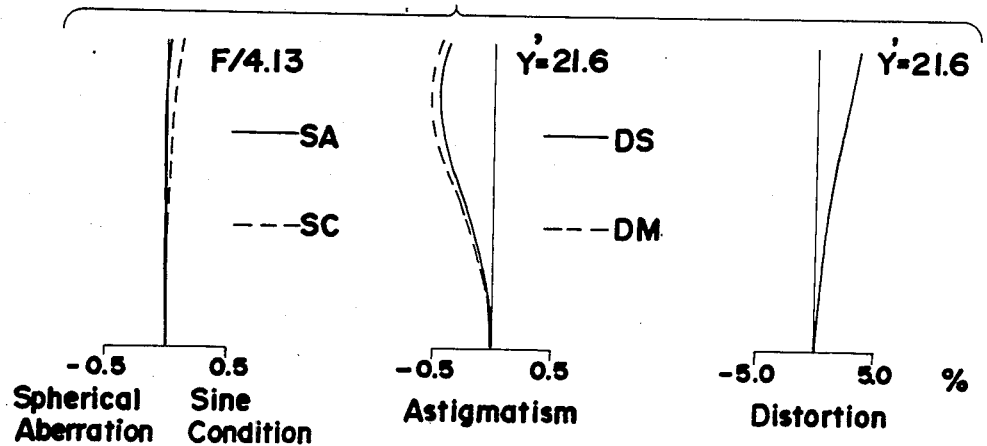
Figure 13A:
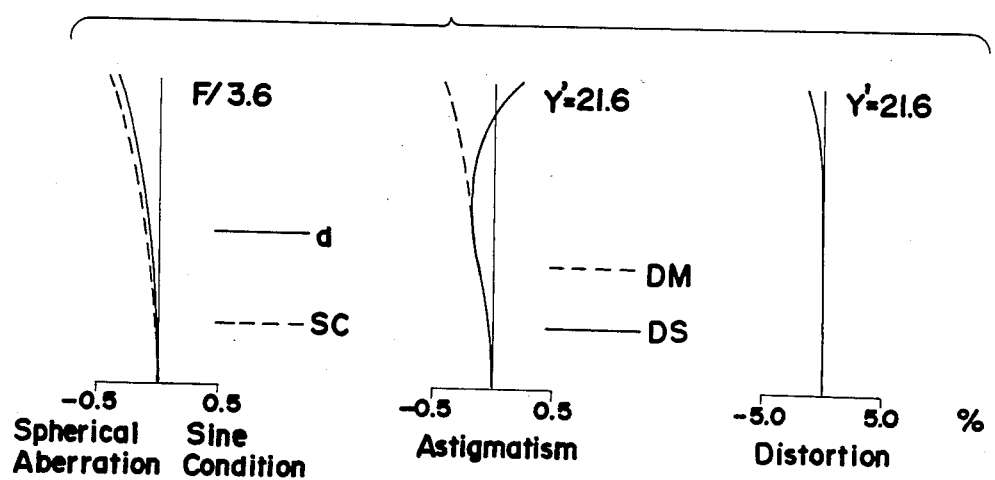
FIGS. 13a and 13b represent the aberration curves of the embodiment 5 for the shortest and longest focal length respectively.
Figure 13B:
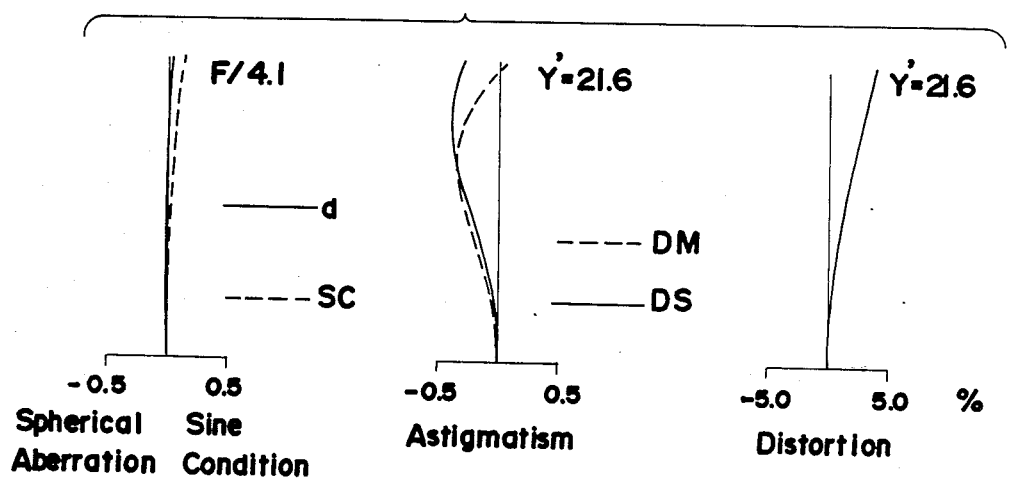
Figure 14A:
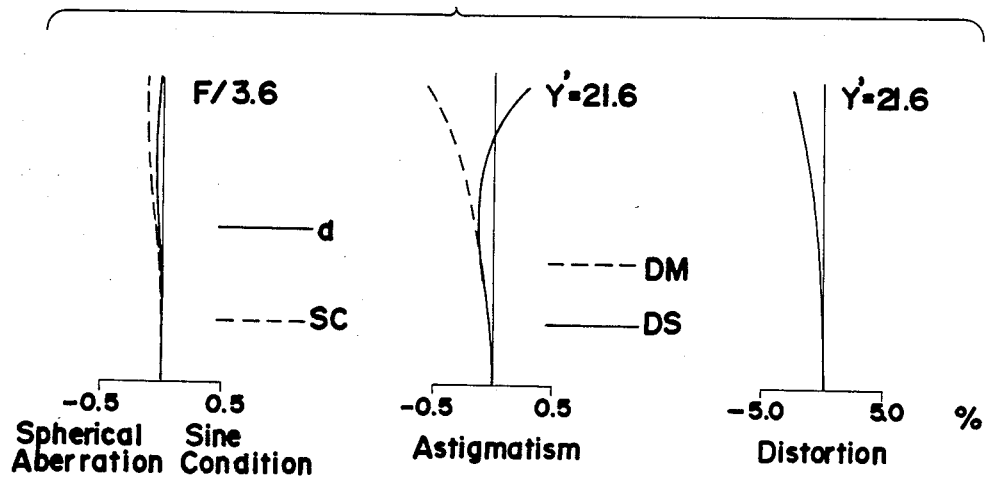
FIGS. 14a and 14b represent the aberration curves of the embodiment 6 for the shortest and longest focal length respectively.
Figure 14B:
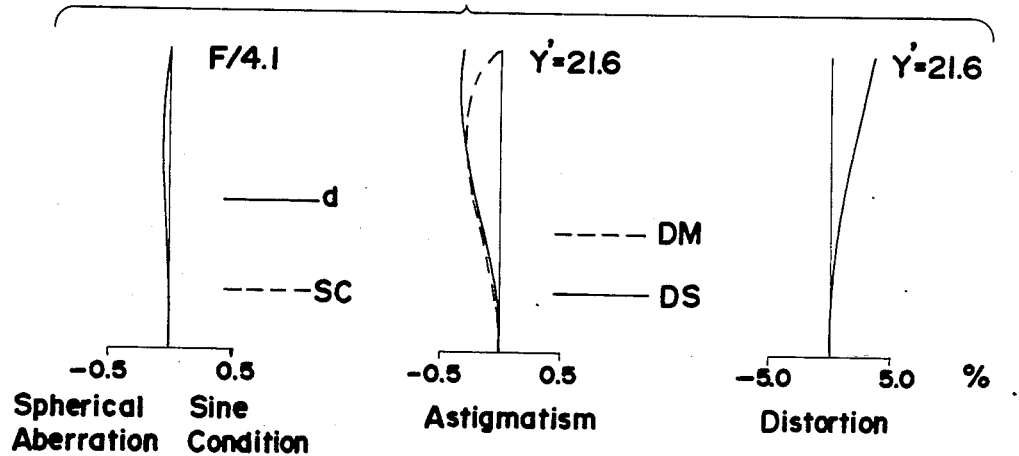
Figure 15A:
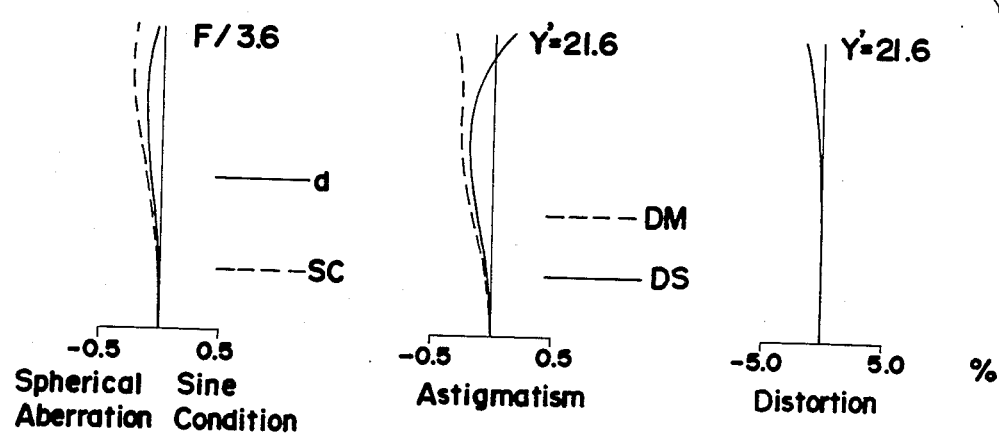
FIGS. 15a and 15b represent the aberration curves of the embodiment 7 for the shortest and longest focal length respectively.
Figure 15B:
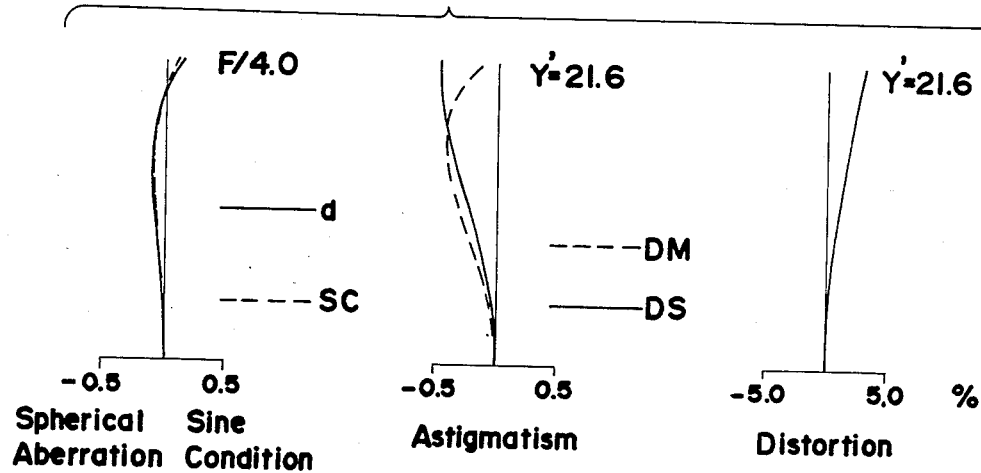
Figure 16A:
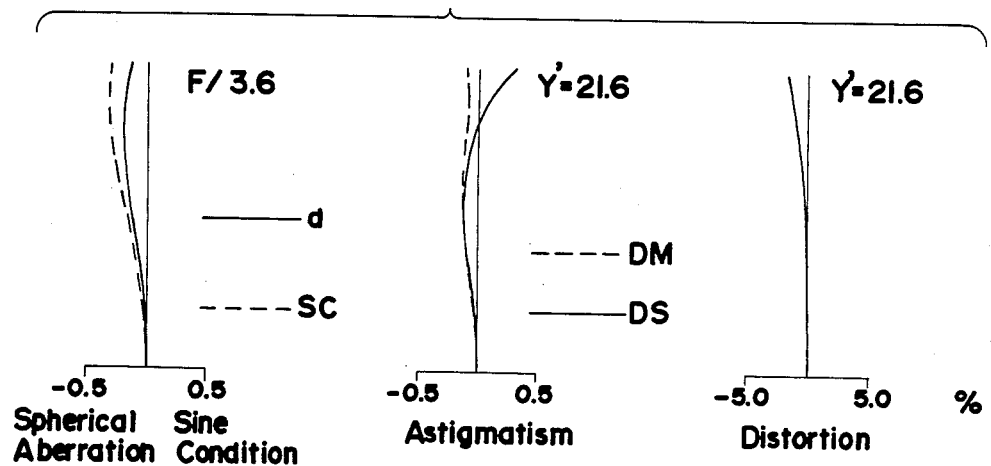
FIGS. 16a and 16b represent the aberration curves of the embodiment 8 for the shortest and longest focal length respectively.
Figure 16B:
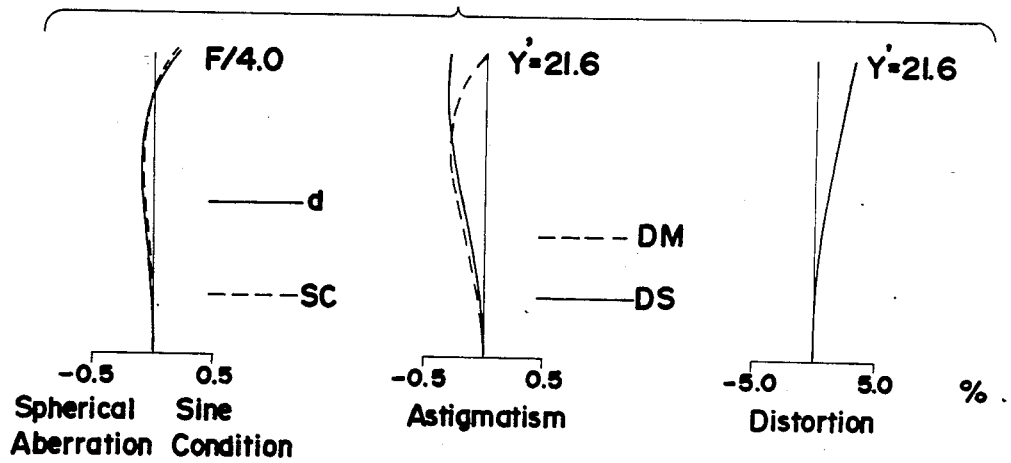

As shown in FIGS. 1 to 8, the present invention provides a variable focal length lens system comprising from object side to image side, a first lens unit I of a positive refractive power, a second lens unit II of a negative refractive power with a first variable air space formed between the first and second lens units I and II, a third lens unit III of a positive refractive power, and a fourth lens unit IV of a negative refractive power with a second variable air space formed between the third lens unit and fourth lens unit III and IV, wherein the back focal length of the whole lens system for the shortest focal length S is less than half of the diagonal length of the image plane, wherein the first lens unit I is shiftable from the image side to the object side while increasing the first variable air space in the zooming operation from the shortest focal length S to the longest focal length L, and wherein the fourth lens unit IV is shiftable from the image side to the object side while decreasing the second variable air space in the zooming operation from the shortest focal length S to the longest focal length L.

According to the present invention, in the zooming operation from the shortest focal length S to the longest focal length L, the first variable air space formed between the first lens unit I and the second lens unit II is increased, while the second variable air space formed between the third lens group III and the fourth lens unit IV is decreased. Therefore, since the zooming effect of the whole lens system can be shared between a plurality of the lens units, the shifting distance of each of the lens units shifted in the zooming operation can be decreased. Furthermore, in the present invention, since the fourth lens unit IV located at the rearmost side has a relatively strong negative power, an ultra compact lens system in which the back focal length of the whole lens system for the shortest focal length S is less than half of the diagonal length of the image plane and in which the total length of the whole lens system (distance from the object side surface of the first lens unit I to the image plane) is extremly short, can be achieved.

As shown in FIGS. 1 to 8, at least one of the second and third lens units II and III is shifted in the zooming operation. This is effective for increasing the zooming effect of the whole lens system and for correcting various aberrations in the zooming operation.

As shown in FIGS. 1 to 4, an aperture stop AS is fixed to the second lens unit II which is stationary in the zooming operation. Therefore, the stop AS is also stationary in the zooming operation. It is useful for making the camera simple and compact.

It is desirable to fulfill the following condition in the present invention:

$$0.7 < \frac{f_s}{|f_4|} < 2.0 \quad (1)$$

wherein, $f_s$ represents the focal length of the whole lens system for the shortest focal length, and $f_4$ represents the focal length of the fourth lens unit IV.

Condition (1) provides the refractive power of the fourth lens group IV. If the lower limit of condition (1) is violated, the desirable compactness of the whole lens system can not be achieved because of the long total length of the whole lens system for the shortest focal length S. On the other hand, if the upper limit of condition (1) is violated, it becomes difficult to sufficiently control the changes in various aberrations in the zooming operation, especially to sufficiently correct the change in the spherical aberration and the change in the astigmatism while being well balanced.

Furthermore, in the present invention, it is desirable to fulfill the following conditions:

$$0.5 < \frac{f_{s123}}{|f_4|} < 1.8 \quad (2)$$

$$1.15 < \frac{\beta_{L4}}{\beta_{S4}} < 2.0 \quad (3)$$

$$0.1 < \frac{\Delta d_{34}}{f_s} < 1.0 \quad (4)$$

wherein, $f_{s123}$ represents the compound focal length of the first to third lens units I, II and III for the shortest focal length S, $f_4$ represents the focal length of the fourth lens unit IV, $\beta_{L4}$ represents the lateral magnification of the fourth lens unit IV for the longest focal length L, $\beta_{S4}$ represents the lateral magnification of the fourth lens unit IV for the shortest focal length S, $\Delta d_{34}$ represents the decreased distance of the second variable air space formed between the third lens unit and fourth lens unit III and IV by the zooming operation from the shortest focal length S to the longest focal length L.

Condition (2) provides that the whole lens system forms a telephoto type lens system for the shortest focal length S in order to shorten the total length for the shortest focal length S. If the upper limit of condition (2) is violated, it becomes impossible to correct the positive distortion. If the lower limit of condition (2) is violated, the desirable compactness of the whole lens system can not be achieved, and the zooming effect of the fourth lens unit IV becomes weak.

Conditions (3) and (4) provide the zooming effect of the fourth lens unit IV. If the upper limit of condition (3) is violated, it causes to increase the refractive power of the fourth lens unit IV, or to increase the shifting distance of the fourth lens unit IV for the zooming operation. Therefore, it becomes difficult to make the fourth lens unit IV relatively simple in construction, and to correct the change in the field curvature in the zooming operation while being well balanced. If the lower limit of condition (3) is violated, the burden of the lens units other than the fourth lens unit IV for the zooming operation is increased too much, and the desirable compactness of the whole lens system which is one of the objects of the present invention can not be achieved.

On the other hand, if the upper limit of condition (4) is violated, the second variable air space formed between the third lens group and fourth lens unit III and IV is increased undesirably. Therefore, it is unfavorable for providing sufficient illumination for the intermediate area of the film. Furthermore, as in the case when the upper limit of condition (3) is violated, it becomes difficult to make the fourth lens unit IV relatively simple in construction, and to correct the change in the field curvature during the zooming operation while being well balanced. If the lower limit of condition (4) is violated, the fourth lens unit IV becomes ineffective for the zooming operation.

In the present invention, it is desirable to construct each of the lens units as described below. Namely, the first lens unit I includes at least a negative lens element having an object side surface convex to the object side, and a positive lens element having an image side surface concave to the image side. Such construction is effective for decreasing the changes in various aberrations, especially the change in the astigmatism, if the first lens unit I is shifted in the focusing operation.

The second lens unit II includes at least a negativej lens element and a positive lens element. Such construction is effective for correcting the chromatic aberration, especially for correcting the lateral magnification chromatic aberration, to be well balanced, during the zooming operation.

The third lens unit III comprises a triplet type lens system including from the object side, a positive lens element, a negative lens element and a positive lens element, or comprises modified type thereof. It is most desirable for correcting the spherical aberration and the coma aberration.

The fourth lens unit IV includes a negative lens element at the rearmost side. It is effective for achieving the desirable compactness of the whole lens system and for correcting the field curvature in the short focal length side.

In order to make the camera compact and simple, the following desirable conditions are useful.

(A) Only the lens unit located at the rearmost side is shifted for the focusing operation. Such construction is favorable especially for automatic focusing cameras in which the focusing lens unit is shifted by an automatic focusing mechanism located in the camera body, because the focusing lens unit is relatively light and is positioned near the camera body.

(B) The shifting distance of the focusing lens unit in the focusing operation is almost constantly independent of the change in the focal length of the whole lens system. It requires no mechanism for compensating the shifting distance of the focusing lens unit in accordance with the change in the focal length. Therefore, it is effective for making the camera simple in construction.

Thus, in order to satisfy the above desirable conditions (A) and (B), it is necessary to shift only the fourth lens unit IV located at the rearmost side for the focusing operation, and to fulfill the following condition:

$$0.80 < \frac{\beta_{L4}^2 - 1}{\beta_{S4}^2 - 1} / Z^2 < 1.15 \qquad (6)$$

wherein, $\beta_{L4}$ represents the lateral magnification of the fourth lens unit IV for the longest focal length L, $\beta_{S4}$ represents the lateral magnification of the fourth lens unit IV for the shortest focal length, and Z represents the zoom ratio of the whole lens system.

The fourth lens unit IV is shifted in the focusing operation for the purpose of satisfying the above desirable condition (1), since it is located at the rearmost side.

Condition (6), is for satisfying the above desirable condition (2). It has been described in the pending U.S. patent application Ser. No. 467,433 filed Feb. 17, 1983, now U.S. Pat. No. 4,636,040, that the following condition is effective for making the shifting distance of the focusing lens unit in the focusing operation constant, independently of the change in the focal length of the whole lens system:

$$P = \frac{f_A^2 \beta_F^2}{\beta_F^2 - 1} = \text{constant} \qquad (7)$$

wherein, $f_A$ represents the compound focal length of the lens units located at the object side than the focusing lens unit shifted for the focusing operation, $\beta_F$ represents the lateral magnification of the focusing lens unit. In the above construction, since the focusing lens unit corresponds to the fourth lens unit IV, the equation (7) is modified as follows:

$$P = \frac{f_{123}^2 \beta_4^2}{\beta_4^2 - 1} = \frac{f^2}{\beta_4^2 - 1} = \text{constant} \qquad (8)$$

wherein, $f_{123}$ represents the compound focal length of the first to third lens units I, II and III, $\beta_4$ represents the lateral magnification of the fourth lens unit IV, and f represents the focal length of the whole lens system.

Here, assuming that $f_S$ represents the focal length of the whole lens system for the shortest focal length, $\beta_{S4}$ represents the lateral magnification of the fourth length unit IV for the shortest focal length S, $f_L$ represents the focal length of the whole lens system for the longest focal length L, and $\beta_{L4}$ represents the lateral magnification of the fourth lens unit IV for the longest focal length, the following equations are introduced from the equation (8):

$$P_S = \frac{f_S^2}{\beta_{S4}^2 - 1} \quad (9)$$

$$P_L = \frac{f_L^2}{\beta_{L4}^2 - 1} \quad (10)$$

wherein, $P_S$ represents the value P of the equation (8) in the shortest focal length condition, and $P_L$ represents the value P in the longest focal length condition. The ratio between $P_S$ and $P_L$ is shown as follows:

$$\frac{P_S}{P_L} = \frac{(\beta_{L4}^2 - 1)}{(\beta_{S4}^2 - 1)} \cdot \frac{f_S^2}{f_L^2} \quad (11)$$

$$\frac{\beta_{L4}^2 - 1}{\beta_{S4}^2 - 1} / Z^2$$

wherein, Z represents the zoom ratio of the whole lens system ($Z = f_L/f_S$). When the ratio $P_S/P_L$ shown in the equation (11) is limited within a range of 0.80 and 1.15 as shown in the condition (6), the change in the best image plane position of the whole lens system due to the zooming is controlled within the depth of focus of the whole lens system without compensating the position of the fourth lens unit IV according to the change in the focal length of the whole lens system.

If the upper limit of condition (6) is violated, the shifting distance of the fourth lens unit IV for the focusing operation in the shortest focal length condition is undesirably increased in comparison with that in the longest focal length condition. On the contrary, if the lower limit of condition (6) is violated, the shifting distance of the fourth lens unit IV for the focusing operation in the longest focal length condition is undesirably increased in comparison with that in the shortest focal length condition.

Table 9 is prepared in order to show that the shifting distance of the focusing lens unit in the focusing operation is almost constant in the Embodiments 5 to 8. In Table 9, $\Delta f_b'$ represents the change in the position of the image plane by the zooming operation from the longest focal length L to the shortest focal length S, and $d_f'$ represents the shifting distance of the focusing lens unit (the fourth lens unit IV). As is clear from Table 9, it is not necessary to correct the position of the focusing lens after the zooming operation is completed since $\Delta f_b'$ is very small.

Additionally, since each of the lens units is simple in construction, the lens system of the present invention can be approximated to the thin lens system with good approximation.

The following Tables 1 to 8 disclose, respectively, the embodiments 1 to 8 of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, $\nu$ equals the Abbe number and the sub numbers refer to the specific lens elements from the object to image side.

TABLE 1

Embodiment 1
$f = 39.0 \sim 50.0 \sim 62.0 \quad F_{No.} = 3.6 \sim 4.1 \sim 4.2$

| radius of curvature | axial distance | refractive index (Nd) | | Abbe number (νd) | |
|---|---|---|---|---|---|
| r1  57.985 | | | | | |
| | d1  1.500 | $N_1$ | 1.84666 | $\nu_1$ | 23.88 |
| r2  29.417 | | | | | |
| | d2  3.300 | $N_2$ | 1.69680 | $\nu_2$ | 56.47 |
| r3  76.987 | | | | | |
| | d3  0.150 | | | | |
| r4  20.517 | | | | | |
| | d4  3.700 | $N_3$ | 1.69680 | $\nu_3$ | 56.47 |
| r5  45.102 | | | | | |
| | d5  2.000~7.109~13.059 | | | | |
| r6  −46.081 | | | | | |
| | d6  1.100 | $N_4$ | 1.74250 | $\nu_4$ | 52.51 |
| r7  18.868 | | | | | |
| | d7  1.700 | $N_5$ | 1.80518 | $\nu_5$ | 25.43 |
| r8  43.670 | | | | | |
| | d8  5.870~4.265~3.000 | | | | |
| r9  48.677 | | | | | |
| | d9  1.708 | $N_6$ | 1.77250 | $\nu_6$ | 49.77 |
| r10 −54.163 | | | | | |
| | d10 0.150 | | | | |
| r11 20.458 | | | | | |
| | d11 1.815 | $N_7$ | 1.71300 | $\nu_7$ | 53.93 |
| r12 122.565 | | | | | |
| | d12 0.360 | | | | |
| r13 −84.395 | | | | | |
| | d13 1.603 | $N_8$ | 1.80518 | $\nu_8$ | 25.43 |
| r14 23.349 | | | | | |
| | d14 2.523 | | | | |
| r15 57.734 | | | | | |
| | d15 2.576 | $N_9$ | 1.66446 | $\nu_9$ | 35.84 |
| r16 −37.964 | | | | | |
| | d16 15.158~8.813~3.028 | | | | |
| r17 −18.162 | | | | | |
| | d17 2.500 | $N_{10}$ | 1.69680 | $\nu_{10}$ | 56.47 |
| r18 −69.675 | | | | | |
| $\Sigma d = 47.712 \sim 44.871 \sim 43.772$ | | | | | |

TABLE 2

Embodiment 2
$f = 39.0 \sim 50.0 \sim 62.0 \quad F_{No.} = 3.6 \sim 4.1 \sim 4.4$

| radius of curvature | axial distance | refractive index (Nd) | | Abbe number (νd) | |
|---|---|---|---|---|---|
| r1  25.381 | | | | | |
| | d1  1.500 | $N_1$ | 1.84666 | $\nu_1$ | 23.88 |
| r2  18.744 | | | | | |
| | d2  1.200 | | | | |
| r3  19.027 | | | | | |
| | d3  7.500 | $N_2$ | 1.69680 | $\nu_2$ | 56.47 |
| r4  52.853 | | | | | |
| | d4  2.500~8.340~15.113 | | | | |
| r5  −48.477 | | | | | |
| | d5  1.300 | $N_3$ | 1.77250 | $\nu_3$ | 49.77 |
| r6  23.059 | | | | | |
| | d6  2.000 | $N_4$ | 1.75000 | $\nu_4$ | 25.14 |
| r7  67.373 | | | | | |
| | d7  6.737~4.744~3.000 | | | | |
| r8  36.842 | | | | | |
| | d8  1.916 | $N_5$ | 1.77250 | $\nu_5$ | 49.77 |
| r9  −58.631 | | | | | |
| | d9  0.500 | | | | |
| r10 18.670 | | | | | |
| | d10 2.100 | $N_6$ | 1.71300 | $\nu_6$ | 53.93 |
| r11 128.442 | | | | | |
| | d11 0.500 | | | | |
| r12 −51.640 | | | | | |
| | d12 1.788 | $N_7$ | 1.80518 | $\nu_7$ | 25.43 |
| r13 20.053 | | | | | |
| | d13 2.156 | | | | |
| r14 131.077 | | | | | |

TABLE 2-continued

Embodiment 2
f = 39.0~50.0~62.0  $F_{No.}$ = 3.6~4.1~4.4

| radius of curvature | | axial distance | refractive index (Nd) | | Abbe number (νd) |
|---|---|---|---|---|---|
| r15 −24.762 | d14 | 3.115 | $N_8$ | 1.67339 | ν8  29.25 |
| r16 −23.062 | d15 | 16.607~10.899~6.144 | | | |
| r17 −97.507 | d16 | 2.500 | $N_9$ | 1.77250 | ν9  49.77 |
| | Σd = 53.918~52.057~52.330 | | | | |

TABLE 3

Embodiment 3
f = 39.0~50.0~62.0  $F_{No.}$ = 3.6~4.1~4.4

| radius of curvature | | axial distance | refractive index (Nd) | | Abbe number (νd) |
|---|---|---|---|---|---|
| r1  25.284 | d1 | 1.500 | $N_1$ | 1.84666 | ν1  23.88 |
| r2  18.667 | d2 | 1.500 | | | |
| r3  18.911 | d3 | 7.500 | $N_2$ | 1.69680 | ν2  56.47 |
| r4  51.664 | d4 | 2.500~8.669~15.408 | | | |
| r5  −44.048 | d5 | 1.300 | $N_3$ | 1.77250 | ν3  49.77 |
| r6  23.246 | d6 | 2.000 | $N_4$ | 1.75000 | ν4  25.14 |
| r7  78.478 | d7 | 7.004~4.945~3.000 | | | |
| r8  33.071 | d8 | 1.916 | $N_5$ | 1.77250 | ν5  49.77 |
| r9  −48.940 | d9 | 0.500 | | | |
| r10  18.415 | d10 | 2.100 | $N_6$ | 1.71300 | ν6  53.93 |
| r11  153.058 | d11 | 0.500 | | | |
| r12  −57.130 | d12 | 1.788 | $N_7$ | 1.80518 | ν7  25.43 |
| r13  18.633 | d13 | 2.156 | | | |
| r14  190.658 | d14 | 3.115 | $N_8$ | 1.67339 | ν8  29.25 |
| r15  −29.187 | d15 | 11.196~5.655~1.000 | | | |
| r16  −61.755 | d16 | 3.000 | $N_9$ | 1.54072 | ν9  47.20 |
| r17  −26.133 | d17 | 2.500 | $N_{10}$ | 1.77250 | ν10  49.77 |
| r18  −60.541 | d18 | 2.500 | | | |
| r19  −24.613 | d19 | 2.500 | $N_{11}$ | 1.77250 | ν11  49.77 |
| r20  −69.265 | | | | | |
| | Σd = 57.074~55.443~55.783 | | | | |

TABLE 4

Embodiment 4
f = 39.0~50.0~62.0  $F_{No.}$ = 3.6~4.0~4.1

| radius of curvature | | axial distance | refractive index (Nd) | | Abbe number (νd) |
|---|---|---|---|---|---|
| r1  30.653 | d1 | 1.500 | $N_1$ | 1.84666 | ν1  23.88 |
| r2  20.233 | d2 | 4.129 | $N_2$ | 1.69680 | ν2  56.47 |
| r3  33.821 | d3 | 0.150 | | | |
| r4  21.712 | d4 | 3.877 | $N_3$ | 1.69680 | ν3  56.47 |
| r5  48.983 | d5 | 1.000~6.037~11.986 | | | |
| r6  58.111 | d6 | 1.000 | $N_4$ | 1.77250 | ν4  49.77 |
| r7  43.938 | d7 | 1.000 | | | |
| r8  −45.915 | d8 | 1.000 | $N_5$ | 1.77250 | ν5  49.77 |
| r9  21.858 | d9 | 1.800 | $N_6$ | 1.75000 | ν6  25.14 |
| r10  82.930 | d10 | 5.469~4.028~3.000 | | | |
| r11  43.530 | d11 | 1.916 | $N_7$ | 1.77250 | ν7  49.77 |
| r12  −61.814 | d12 | 0.150 | | | |
| r13  19.737 | d13 | 2.100 | $N_8$ | 1.71300 | ν8  53.93 |
| r14  117.311 | d14 | 0.500 | | | |
| r15  −66.503 | d15 | 1.788 | $N_9$ | 1.80518 | ν9  25.43 |
| r16  22.313 | d16 | 2.200 | | | |
| r17  60.292 | d17 | 2.787 | $N_{10}$ | 1.67339 | ν10  29.25 |
| r18  −31.220 | d18 | 14.831~8.572~3.000 | | | |
| r19  −18.420 | d19 | 2.500 | $N_{11}$ | 1.77250 | ν11  49.77 |
| r20  −59.178 | | | | | |
| | Σd = 49.697~47.033~46.383 | | | | |

TABLE 5

Embodiment 5
f = 39.0~62.0  $F_{No.}$ = 3.5~4.0

| radius of curvature | | axial distance | refractive index (Nd) | | Abbe number (νd) |
|---|---|---|---|---|---|
| r1  72.478 | d1 | 1.500 | $N_1$ | 1.84666 | ν1  23.88 |
| r2  33.038 | d2 | 3.300 | $N_2$ | 1.69680 | ν2  56.47 |
| r3  105.233 | d3 | 0.150 | | | |
| r4  20.139 | d4 | 3.700 | $N_3$ | 1.69680 | ν3  56.47 |
| r5  42.916 | d5 | 2.000 ~13.497 | | | |
| r6  −39.345 | d6 | 1.100 | $N_4$ | 1.74250 | ν4  52.51 |
| r7  21.444 | d7 | 1.700 | $N_5$ | 1.84666 | ν5  23.83 |
| r8  43.595 | d8 | 5.032~2.139 | | | |
| r9  47.768 | d9 | 1.777 | $N_6$ | 1.77250 | ν6  49.77 |
| r10  −48.305 | d10 | 0.150 | | | |
| r11  20.195 | d11 | 1.750 | $N_7$ | 1.72000 | ν7  50.31 |
| r12  132.660 | d12 | 0.280 | | | |
| r13  −75.700 | d13 | 1.222 | $N_8$ | 1.80518 | ν8  25.43 |
| r14  23.071 | d14 | 2.913 | | | |
| r15  54.355 | d15 | 2.785 | $N_9$ | 1.66446 | ν9  35.84 |
| r16  −32.663 | d16 | 12.990~3.028 | | | |
| r17  −17.493 | d17 | 1.800 | $N_{10}$ | 1.77250 | ν10  49.77 |
| r18  −62.281 | | | | | |
| | Σd = 44.149~42.790 | | | | |

TABLE 6

Embodiment 6
$f = 39.0 \sim 62.0$  $F_{No.} = 3.5 \sim 4.0$

| radius of curvature | | axial distance | | refractive index (Nd) | | Abbe number (νd) |
|---|---|---|---|---|---|---|
| r1 | 65.765 | | | | | |
| | | d1 | 1.500 | $N_1$ | 1.84666 | ν1 23.88 |
| r2 | 32.919 | | | | | |
| | | d2 | 3.300 | $N_2$ | 1.69680 | ν2 56.47 |
| r3 | 81.801 | | | | | |
| | | d3 | 0.150 | | | |
| r4 | 21.854 | | | | | |
| | | d4 | 3.700 | $N_3$ | 1.69680 | ν3 56.47 |
| r5 | 41.983 | | | | | |
| | | d5 | 2.000~16.192 | | | |
| r6 | −56.377 | | | | | |
| | | d6 | 1.100 | $N_4$ | 1.69680 | ν4 56.47 |
| r7 | 23.449 | | | | | |
| | | d7 | 1.700 | $N_5$ | 1.84666 | ν5 23.83 |
| r8 | 61.159 | | | | | |
| | | d8 | 6.807~2.840 | | | |
| r9 | −739.579 | | | | | |
| | | d9 | 2.137 | $N_6$ | 1.77250 | ν6 49.77 |
| r10 | −44.632 | | | | | |
| | | d10 | 0.150 | | | |
| r11 | 20.429 | | | | | |
| | | d11 | 1.750 | $N_7$ | 1.77250 | ν7 49.77 |
| r12 | −168.967 | | | | | |
| | | d12 | 0.550 | | | |
| r13 | −25.806 | | | | | |
| | | d13 | 0.800 | $N_8$ | 1.75000 | ν8 25.14 |
| r14 | 25.777 | | | | | |
| | | d14 | 3.176 | | | |
| r15 | 413.929 | | | | | |
| | | d15 | 2.940 | $N_9$ | 1.80750 | ν9 35.45 |
| r16 | −21.059 | | | | | |
| | | d16 | 12.776~3.028 | | | |
| r17 | −28.941 | | | | | |
| | | d17 | 1.800 | $N_{10}$ | 1.77250 | ν10 49.77 |
| r18 | 806.731 | | | | | |

$\Sigma d = 46.335 \sim 46.812$

TABLE 7

Embodiment 7
$f = 39.0 \sim 62.0$  $F_{No.} = 3.5 \sim 4.0$

| radius of curvature | | axial distance | | refractive index (Nd) | | Abbe number (νd) |
|---|---|---|---|---|---|---|
| r1 | 72.723 | | | | | |
| | | d1 | 1.500 | $N_1$ | 1.84666 | ν1 23.88 |
| r2 | 36.110 | | | | | |
| | | d2 | 3.300 | $N_2$ | 1.75450 | ν2 51.57 |
| r3 | 99.738 | | | | | |
| | | d3 | 0.150 | | | |
| r4 | 20.577 | | | | | |
| | | d4 | 3.200 | $N_3$ | 1.69680 | ν3 56.47 |
| r5 | 33.202 | | | | | |
| | | d5 | 2.000~17.929 | | | |
| r6 | −72.949 | | | | | |
| | | d6 | 1.100 | $N_4$ | 1.69680 | ν4 56.47 |
| r7 | 26.059 | | | | | |
| | | d7 | 1.700 | $N_5$ | 1.84666 | ν5 23.83 |
| r8 | 90.879 | | | | | |
| | | d8 | 6.127~1.627 | | | |

TABLE 7-continued

Embodiment 7
$f = 39.0 \sim 62.0$  $F_{No.} = 3.5 \sim 4.0$

| radius of curvature | | axial distance | | refractive index (Nd) | | Abbe number (νd) |
|---|---|---|---|---|---|---|
| r9 | 27.153 | | | | | |
| | | d9 | 2.200 | $N_6$ | 1.77250 | ν6 49.77 |
| r10 | −29.043 | | | | | |
| | | d10 | 0.550 | | | |
| r11 | −16.039 | | | | | |
| | | d11 | 0.800 | $N_7$ | 1.75000 | ν7 25.14 |
| r12 | 28.462 | | | | | |
| | | d12 | 2.373 | | | |
| r13 | 94.968 | | | | | |
| | | d13 | 3.780 | $N_8$ | 1.80750 | ν8 35.45 |
| r14 | −18.147 | | | | | |
| | | d14 | 13.171~3.028 | | | |
| r15 | −28.330 | | | | | |
| | | d15 | 1.800 | $N_9$ | 1.77250 | ν9 49.77 |
| r16 | −1952.438 | | | | | |

$\Sigma d = 43.751 \sim 45.037$

TABLE 8

Embodiment 8
$f = 39.0 \sim 62.0$  $F_{No.} = 3.5$

| radius of curvature | | axial distance | | refractive index (Nd) | | Abbe number (νd) |
|---|---|---|---|---|---|---|
| r1 | 72.389 | | | | | |
| | | d1 | 1.500 | $N_1$ | 1.84666 | ν1 23.88 |
| r2 | 36.269 | | | | | |
| | | d2 | 3.300 | $N_2$ | 1.75450 | ν2 51.57 |
| r3 | 32.027 | | | | | |
| | | d3 | 0.150 | | | |
| r4 | 21.276 | | | | | |
| | | d4 | 3.200 | $N_3$ | 1.69680 | ν3 56.47 |
| r5 | 36.442 | | | | | |
| | | d5 | 2.000~17.284 | | | |
| r6 | −71.032 | | | | | |
| | | d6 | 1.100 | $N_4$ | 1.69680 | ν4 56.47 |
| r7 | 26.695 | | | | | |
| | | d7 | 1.700 | $N_5$ | 1.84666 | ν5 23.83 |
| r8 | 81.505 | | | | | |
| | | d8 | 6.743~2.243 | | | |
| r9 | 26.757 | | | | | |
| | | d9 | 2.200 | $N_6$ | 1.77250 | ν6 49.77 |
| r10 | −28.036 | | | | | |
| | | d10 | 0.550 | | | |
| r11 | −15.975 | | | | | |
| | | d11 | 0.800 | $N_7$ | 1.75000 | ν7 25.14 |
| r12 | 30.496 | | | | | |
| | | d12 | 2.373 | | | |
| r13 | 106.499 | | | | | |
| | | d13 | 3.280 | $N_8$ | 1.80750 | ν8 35.45 |
| r14 | −18.217 | | | | | |
| | | d14 | 12.557~3.028 | | | |
| r15 | −28.199 | | | | | |
| | | d15 | 2.000 | $N_9$ | 1.77250 | ν9 49.77 |
| r16 | −25.090 | | | | | |
| | | d16 | 0.800 | | | |
| r17 | −23.072 | | | | | |
| | | d17 | 1.200 | $N_{10}$ | 1.77250 | ν10 49.77 |
| r18 | −603.500 | | | | | |

$\Sigma d = 45.452 \sim 46.708$

TABLE 9

(mm)

| Photographing Distance (m) | Embodiment 5 | | Embodiment 6 | | Embodiment 7 | | Embodiment 8 | |
|---|---|---|---|---|---|---|---|---|
| | $\Delta f_b$ | $d'_f$ | $\Delta f_b$ | $d'_f$ | $\Delta f_b$ | $d'_f$ | $\Delta f_b$ | $d'_f$ |
| 50.00 | −0.001 | 0.037 | −0.001 | 0.039 | −0.000 | 0.038 | −0.001 | 0.036 |
| 30.00 | −0.001 | 0.061 | −0.002 | 0.065 | −0.001 | 0.064 | −0.001 | 0.061 |
| 20.00 | −0.001 | 0.092 | −0.003 | 0.098 | −0.001 | 0.095 | −0.001 | 0.091 |
| 15.00 | −0.002 | 0.123 | −0.004 | 0.130 | −0.001 | 0.127 | −0.002 | 0.122 |
| 10.00 | −0.002 | 0.185 | −0.005 | 0.196 | −0.001 | 0.192 | −0.003 | 0.184 |
| 7.00 | −0.003 | 0.266 | −0.007 | 0.281 | −0.002 | 0.275 | −0.004 | 0.263 |
| 5.00 | −0.004 | 0.374 | −0.009 | 0.396 | −0.002 | 0.387 | −0.005 | 0.370 |
| 4.00 | −0.004 | 0.470 | −0.011 | 0.497 | −0.002 | 0.485 | −0.005 | 0.465 |
| 3.00 | −0.004 | 0.632 | −0.014 | 0.668 | −0.002 | 0.652 | −0.006 | 0.625 |

TABLE 9-continued

| Photographing | Embodiment 5 | | Embodiment 6 | | Embodiment 7 | | Embodiment 8 (mm) | |
|---|---|---|---|---|---|---|---|---|
| Distance (m) | $\Delta f_b$ | $d'_f$ | $\Delta f_b$ | $d'_f$ | $\Delta f_b$ | $d'_f$ | $\Delta f_b$ | $d'_f$ |
| 2.50 | −0.004 | 0.763 | −0.015 | 0.806 | −0.001 | 0.787 | −0.006 | 0.754 |
| 2.00 | −0.003 | 0.963 | −0.016 | 1.017 | 0.001 | 0.993 | −0.006 | 0.951 |
| 1.70 | −0.001 | 1.142 | −0.017 | 1.207 | 0.004 | 1.177 | −0.004 | 1.128 |
| 1.50 | 0.001 | 1.305 | −0.016 | 1.378 | 0.007 | 1.344 | −0.003 | 1.287 |
| 1.30 | 0.005 | 1.521 | −0.014 | 1.605 | 0.011 | 1.565 | 0.000 | 1.500 |
| 1.20 | 0.009 | 1.658 | −0.013 | 1.750 | 0.015 | 1.706 | 0.003 | 1.634 |
| 1.10 | 0.013 | 1.823 | −0.010 | 1.923 | 0.020 | 1.874 | 0.007 | 1.796 |
| 1.00 | 0.019 | 2.023 | −0.006 | 2.134 | 0.027 | 2.080 | 0.012 | 1.992 |

What is claimed is:

1. A variable focal length lens system comprising from object side to image side:
   a first lens unit of a positive refractive power;
   a second lens untin of a negative refractive power with a first variable air space formed between the first and second lens units;
   a third lens unit of a positive refractive power; and
   a fourth lens unit of a negative refractive power with a second variable air space formed between the third lens unit and fourth lens unit;
   wherein the back focal length of the whole lens system for the shortest focal length is less than half of the diagonal length of the image plane;
   wherein the first lens unit is shiftable from the image side to the object side while increasing the first variable air space in the zooming operation from the shortest focal length to the longest focal length; and
   wherein the fourth lens unit is shiftable from the image side to the object side while decreasing the second variable air space in the zooming operation from the shortest focal length to the longest focal length.

2. A variable focal length lens system as claimed in claim 1, wherein the lens system fulfills the following condition:

$$0.7 < \frac{f_S}{|f_4|} < 2.0$$

wherein,
   $f_S$ represents the focal length of the whole lens system for the shortest focal length, and $f_4$ represents the focal length of the fourth lens unit.

3. A variable focal length lens system as claimed in claim 1, wherein the fourth lens unit is shiftable along the optical axis in the focusing operation, and wherein the lens system further fulfills the following condition;

$$0.80 < \frac{\beta_{L4}^2 - 1}{\beta_{S4}^2 - 1} / Z^2 < 1.15$$

wherein,
   $\beta_{L4}$ represents the lateral magnification of the fourth lens unit for the longest focal length,
   $\beta_{S4}$ represents the lateral magnification of the fourth lens unit for the shortest focal length, and
   Z represents the zoom ratio of the whole lens system.

4. A variable focal length lens system as claimed in claim 1, wherein the first lens unit includes a negative lens element having an object side surface convex to the object side, and a positive lens element having an image side surface concave to the image side.

5. A variable focal length lens system as claimed in claim 1, wherein the second unit includes a negative lens element and a positive lens element.

6. A variable focal length lens system as claimed in claim 1, wherein the third lens unit includes from the object side to the image side, a positive lens element, a negative lens element and a positive lens element.

7. A variable focal length lens system as claimed in claim 1, wherein the fourth lens unit includes a negative meniscus lens element located at the rearmost side.

8. A variable focal length lens system as claimed in claim 1, wherein the third lens unit is shiftable during the zooming operation while changing a third variable air space formed between the second and third lens units.

9. A variable focal length lens system as claimed in claim 2, wherein the second lens unit is stationary along the optical axis of the whole lens system in the zooming operation, and the lens system further includes an aperture stop fixed to the second lens unit.

10. A variable focal length lens system as claimed in claim 1, wherein the lens system fulfills the following condition;

$$0.5 < \frac{f_{S123}}{|f_4|} < 1.8 .$$

wherein,
   $f_{S123}$ represents the compound focal length of the first to third lens units for the shortest focal length, and
   $f_4$ represents the focal length of the fourth lens unit.

11. A variable focal length lens system as claimed in claim 10, wherein the lens system further fulfills the following conditions:

$$1.15 < \frac{\beta_{L4}}{\beta_{S4}} < 2.0$$

$$0.1 < \frac{\Delta d34}{f_S} < 1.0$$

wherein,
   $\beta_{L4}$ represents the lateral magnification of the fourth lens unit for the longest focal length,
   $\beta_{S4}$ represents the lateral magnification of the fourth lens unit for the shortest focal length,
   $\Delta d34$ represents the decreased distance of the second variable air space by the zooming operation from the shortest focal length to the longest focal length, and
   $f_S$ represents the focal length of the whole lens system for the shortest focal length.

12. A variable focal length lens system comprising the following design parameters:

| | f = 39.0~50.0~62.0 F$_{No}$ = 3.6~4.1~4.2 | | | |
|---|---|---|---|---|
| | radius of curvature | axial distance | refractive index (Nd) | Abbe number (νd) |
| r1 | 57.985 | | | |
| | | d1 1.500 | N$_1$ 1.84666 | ν1 23.88 |
| r2 | 29.417 | | | |
| | | d2 3.300 | N$_2$ 1.69680 | ν2 56.47 |
| r3 | 76.987 | | | |
| | | d3 0.150 | | |
| r4 | 20.517 | | | |
| | | d4 3.700 | N$_3$ 1.69680 | ν3 56.47 |
| r5 | 45.102 | | | |
| | | d5 2.000~7.109~13.059 | | |
| r6 | −46.081 | | | |
| | | d6 1.100 | N$_4$ 1.74250 | ν4 52.51 |
| r7 | 18.868 | | | |
| | | d7 1.700 | N$_5$ 1.80518 | ν5 25.43 |
| r8 | 43.670 | | | |
| | | d8 5.870~4.265~3.000 | | |
| r9 | 48.677 | | | |
| | | d9 1.708 | N$_6$ 1.77250 | ν6 49.77 |
| r10 | −54.163 | | | |
| | | d10 0.150 | | |
| r11 | 20.458 | | | |
| | | d11 1.815 | N$_7$ 1.71300 | ν7 53.93 |
| r12 | 122.565 | | | |
| | | d12 0.360 | | |
| r13 | −84.395 | | | |
| | | d13 1.603 | N$_8$ 1.80518 | ν8 25.43 |
| r14 | 23.349 | | | |
| | | d14 2.523 | | |
| r15 | 57.734 | | | |
| | | d15 2.576 | N$_9$ 1.66446 | ν9 35.84 |
| r16 | −37.964 | | | |
| | | d16 15.158~8.813~3.028 | | |
| r17 | −18.162 | | | |
| | | d17 2.500 | N$_{10}$ 1.69680 | ν10 56.47 |
| r18 | −69.675 | | | |

13. A variable focal length lens system comprising the following design parameters:

| | f = 39.0~62.0 F$_{No}$ = 3.5 | | | |
|---|---|---|---|---|
| | radius of curvature | axial distance | refractive index (Nd) | Abbe number (νd) |
| r1 | 72.389 | | | |
| | | d1 1.500 | N$_1$ 1.84666 | ν1 23.88 |
| r2 | 36.269 | | | |
| | | d2 3.300 | N$_2$ 1.75450 | ν2 51.57 |
| r3 | 32.027 | | | |
| | | d3 0.150 | | |
| r4 | 21.276 | | | |
| | | d4 3.200 | N$_3$ 1.69680 | ν3 56.47 |
| r5 | 36.442 | | | |
| | | d5 2.000~17.284 | | |
| r6 | −71.032 | | | |
| | | d6 1.100 | N$_4$ 1.69680 | ν4 56.47 |
| r7 | 26.695 | | | |
| | | d7 1.700 | N$_5$ 1.84666 | ν5 23.83 |
| r8 | 81.505 | | | |
| | | d8 6.743~2.243 | | |
| r9 | 26.757 | | | |
| | | d9 2.200 | N$_6$ 1.77250 | ν6 49.77 |
| r10 | −28.036 | | | |
| | | d10 0.550 | | |
| r11 | −15.975 | | | |
| | | d11 0.800 | N$_7$ 1.75000 | ν7 25.14 |
| r12 | 30.496 | | | |
| | | d12 2.373 | | |
| r13 | 106.499 | | | |
| | | d13 3.280 | N$_8$ 1.80750 | ν8 35.45 |
| r14 | −18.217 | | | |
| | | d14 12.557~3.028 | | |
| r15 | −28.199 | | | |
| | | d15 2.000 | N$_9$ 1.77250 | ν9 49.77 |
| r16 | −25.090 | | | |
| | | d16 0.800 | | |
| r17 | −23.072 | | | |
| | | d17 1.200 | N$_{10}$ 1.77250 | ν10 49.77 |
| r18 | −603.500 | | | |

14. A variable focal length lens system, comprising from object side to image side:
   a first lens unit of a positive refractive power;
   a second lens unit of a negative refractive power with a first variable air space formed between the first and second lens units;
   a third lens unit of a positive refractive power; and
   a fourth lens element of a negative refractive power with a second variable air space formed between the third lens unit and the fourth lens element;
   wherein the back focal length of the whole lens system for the shortest focal length is less than half of the diagonal length of the image plane;
   wherein the first lens unit is shiftable from the image side to the object side while increasing the first variable air space in the zooming operation from the shortest focal length to the longest focal length; and
   wherein the fourth lens element is shiftable from the image side to the object side while decreasing the second variable air space in the zooming operation from the shortest focal length to the longest focal length.

15. A variable focal length lens system as claimed in claim 14, wherein the lens system fulfills the following condition:

$$0.7 < \frac{f_S}{|f_4|} < 2.0$$

wherein:
   $f_S$ represents the focal length of the whole lens system for the shortest focal length, and $f_4$ represents the focal length of the fourth lens element.

16. A variable focal length lens system as claimed in claim 14, wherein the first lens unit includes a negative lens element having an object side surface convex to the object side, and a positive lens element having an image side surface concave to the image side.

17. A variable focal length lens system as claimed in claim 14, wherein the second lens unit includes a negative lens element and a positive lens element.

18. A variable focal length lens system as claimed in claim 14, wherein the third lens unit includes from the object side to the image side, a positive lens element, a negative lens element and a positive lens element.

19. A variable focal length lens system as claimed in claim 14, wherein at least one of the second and third lens units is shiftable in the zooming operation.

20. A variable focal length lens system as claimed in claim 19, wherein the second lens unit is stationary along the optical axis of the whole lens system in the zooming operation, and the lens system further includes an aperture stop fixed to the second lens unit.

21. A variable focal length lens system as claimed in claim 14, wherein the lens system fulfills the following condition:

$$0.5 < \frac{f_{S123}}{|f_4|} < 1.8$$

wherein, $f_S$ represents the compound focal length of the first to third lens units for the shortest focal length, and $f_4$ represents the focal length of the fourth lens element.

22. A variable focal length lens system as claimed in claim 21, wherein the lens system further fulfills the following conditions:

$$1.15 < \frac{\beta_{L4}}{\beta_{S4}} < 2.0$$

$$0.1 < \frac{\Delta d34}{f_S} < 1.0$$

wherein, $\beta_{L4}$ represents the lateral magnification of the fourth lens element for the shortest focal length, $\beta_{S4}$ represents the lateral magnification of the fourth lens element for the shortest focal length, $\Delta d34$ represents the decreased distance of the second variable air space by the zooming operation from the shortest focal length to the longest focal length, and $f_S$ represents the focal length of the whole lens system for the shortest focal length.

* * * * *